United States Patent
Ba-abbad et al.

(10) Patent No.: US 9,732,987 B2
(45) Date of Patent: Aug. 15, 2017

(54) TWO AXIS SOLAR TRACKING SYSTEM

(71) Applicant: King Saud University, Riyadh (SA)

(72) Inventors: Mazen A. Ba-abbad, Riyadh (SA);
Hany Al-Ansary, Riyadh (SA); Essam Al-Ammar, Riyadh (SA)

(73) Assignee: King Saud University, Riyadh (SA)

( * ) Notice: Subject to any disclaimer, the term of this patent is extended or adjusted under 35 U.S.C. 154(b) by 721 days.

(21) Appl. No.: 14/298,283

(22) Filed: Jun. 6, 2014

(65) Prior Publication Data

US 2015/0354858 A1 Dec. 10, 2015

(51) Int. Cl.
F24J 2/38 (2014.01)
F24J 2/08 (2006.01)
F24J 2/54 (2006.01)

(52) U.S. Cl.
CPC . *F24J 2/38* (2013.01); *F24J 2/08* (2013.01); *F24J 2/5417* (2013.01); *Y02E 10/47* (2013.01)

(58) Field of Classification Search
CPC ..... F24J 2/38; F24J 2/5417; F24J 2/08; Y02E 10/47
USPC ....... 126/574, 576, 577, 573, 605–607, 601, 126/600; 74/480 R, 479.01, 471 R
See application file for complete search history.

(56) References Cited

U.S. PATENT DOCUMENTS

| | | | |
|---|---|---|---|
| 2,878,331 A * | 3/1959 | Fjellstedt | H01H 3/46 200/48 R |
| 4,153,039 A | 5/1979 | Carroll | |
| 4,349,245 A | 9/1982 | Kliman | |
| 4,823,772 A | 4/1989 | Lenz | |
| 6,302,099 B1 | 10/2001 | McDermott | |
| 7,202,457 B2 | 4/2007 | Janus et al. | |
| 7,252,084 B2 | 8/2007 | Pawlenko et al. | |
| 8,203,070 B2 | 6/2012 | Homyk et al. | |
| 8,469,022 B2 | 6/2013 | Cowan et al. | |
| 8,492,645 B1 | 7/2013 | Strahm | |
| 2008/0282828 A1* | 11/2008 | Jones | H02S 20/30 74/471 R |
| 2009/0114211 A1* | 5/2009 | Homyk | F24J 2/085 126/578 |

\* cited by examiner

*Primary Examiner* — Avinash Savani
*Assistant Examiner* — Rabeeul Zuberi
(74) *Attorney, Agent, or Firm* — Hauptman Ham, LLP

(57) ABSTRACT

A modular two axis solar tracking system contemplates a first fixed base and a slidable/rotatable arm fixed to the first fixed base. The fixed base includes a primary linear actuator and a first movable element movable along a fixed axis. A second linear actuator is fixed at one end of the first movable element and an inverted J-shaped element is movable along a second axis that is perpendicular to the first axis. A second fixed base is disposed in an open area surrounded by an open area defined by a U-shaped lower portion of the inverted J-shaped element. A slidable rotatable arm includes a projection coupled to the inverted J-shaped element that together with the first and second actuator move collection at the ends of the slidable/rotatable arm or arms to track the sun.

7 Claims, 5 Drawing Sheets

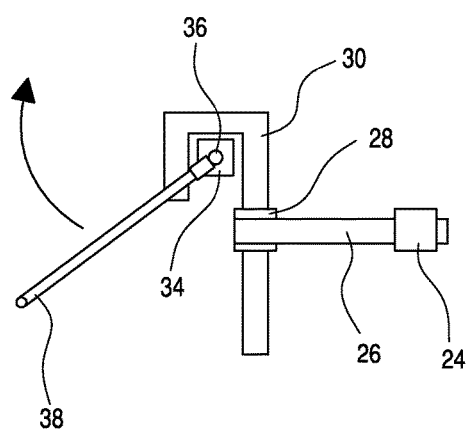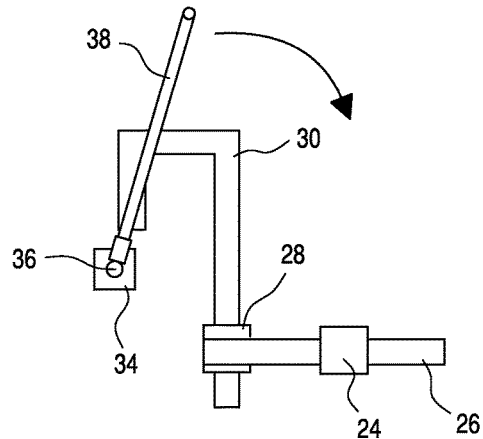
FIG. 2a            FIG. 2b
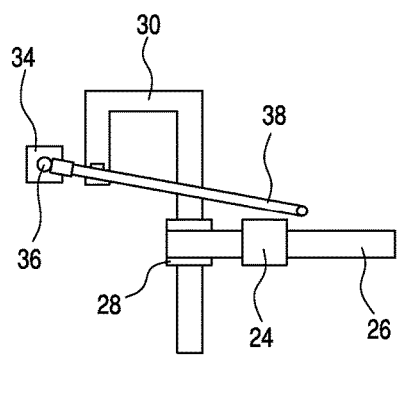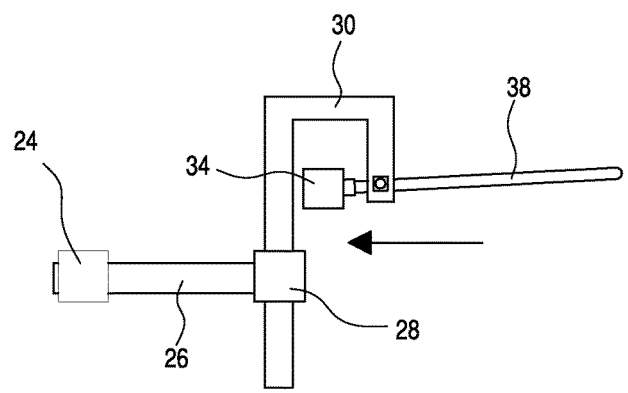
FIG. 2c            FIG. 3

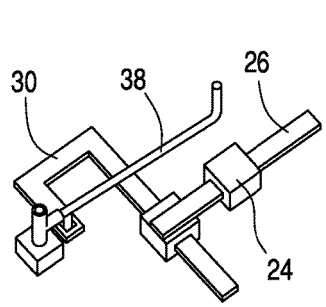 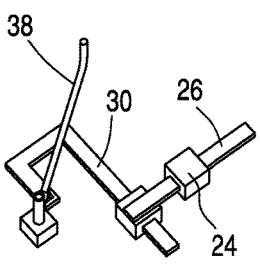 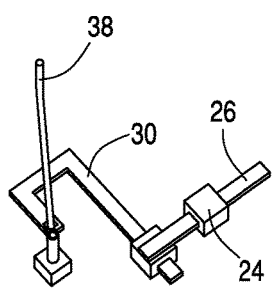
FIG. 4a    FIG. 4b    FIG. 4c
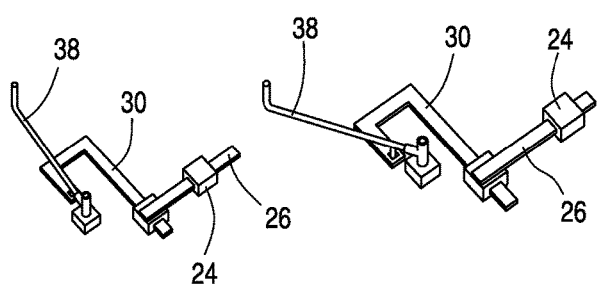 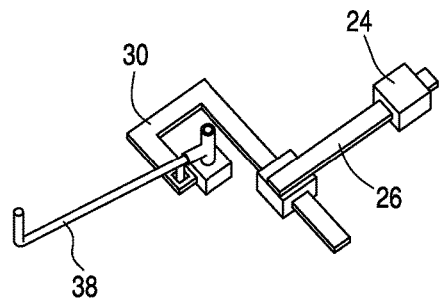
FIG. 4d    FIG. 4e    FIG. 4f

TWO AXIS SOLAR TRACKING SYSTEM

FIELD OF THE INVENTION

This invention relates to a two axis solar tracking system and more particularly to a modular two axis solar tracking system having a fixed base, a primary linear actuator, a secondary linear actuator and an inverted J-shaped element movable by the second actuator along a second axis that is perpendicular to a first axis.

BACKGROUND OF THE INVENTION

Solar tracking systems are well known and have been in use for many years. For example, a U.S. Patent of McDermott U.S. Pat. No. 6,302,099 discloses a Modular Solar Tracking Frame. The McDermott patent discloses a low cost, modular structure with a continuous, horizontal, rotatable spine supported on posts fixed to the ground, providing one axis of rotation for pointing solar collectors in the North-South direction and vertical roll axis bars mounted orthogonally to the spine providing an additional axis of rotation in the East-West direction. Push rods provide linear motion for control of any number of solar collector modules, with the linear motion being translated to rotary motion by pulleys and cables attached to wheels or are segments mounted to the spine and roll axis bars. Thus, a whole array of solar collector modules can be driven by a single solar tracking device and two drive devices. Additionally, when arrayed in multiple rows of the number of solar collector modules controlled can be multiplied so that a "solar farm" covering a large area could be controlled by the single solar tracking device and a minimal number of drive devices.

A more recent U.S. Pat. No. 7,252,084 of Pawlenko et al. discloses a further approach to a Solar Tracking System. As disclosed, the solar tracking system has a first set of solar heat gain transducers that produce respective first output signals to drive a reversible first motor for changing a vertical angle of a solar collector; and a second set of solar heat gain transducers that produce respective second output signals to drive a reversible second motor for changing a horizontal angle of the solar collector; each of the transducers having a thermistor in thermal contact with a thermal mass; and a communications apparatus receiving output voltage from solar cells on the solar collector.

A still further approach to an Automated Solar Tracking System is disclosed in a U.S. Pat. No. 8,203,070 of Homyk et al. An automated tracking solar power collector is disclosed. The tracking solar powered collector includes at least one solar collector such as a solar concentrator and an actuator coupled to the at least one solar collector. The tracking solar power collector further includes a tracking controller configured to aim the at least one solar collector toward the sun with the actuator; and, a power controller configured to supply power to the actuator based on an energy collected by the at least one solar collector.

Notwithstanding the above, it is presently believed that there is a need and a potential commercial market for an improved solar tracking system in accordance with the present invention. There should be a commercial market for such devices because of an increased demand for solar collectors as an alternative source of electrical energy. This demand for alternative sources of electrical energy has led to a demand for more efficient tracking devices that provide a direct fact to the sun as it passes overhead allowing the normally oblique rays of morning and evening to strike a collector and/or multiple collectors directly for additional solar gain.

SUMMARY OF THE INVENTION

In essence, a modular two axis solar tracking system according to the present invention comprises a first fixed base and a sliding rotatable arm. To be more specific, the first fixed based includes a primary linear actuator (including a first computer programmable motor) and a first element that is movable along a first axis. A second linear actuator including a second computer programmable motor is fixed at one end of the first element. A second inverted J-shaped element is movable by the second actuator along a second axis that is perpendicular to the first axis. A second fixed based is disposed in an open area defined by a U-shaped portion of the inverted J-shaped element and the U-shaped portion includes a relatively short elongated opening in the outer short end of the J-shaped element. In addition, a rotatable slidable arm having an upwardly extending L-shaped end and a downwardly extending projection generally parallel to the upwardly extending end extending into the elongated opening. A slidable rotatable arm and the computer programmable first and second motors cause the rotatable slidable arm to move about an arc.

To be more specific, a modular two axis solar tracking system comprises or consists of:
- a first fixed base and a primary linear actuator disposed on said first fixed base and having a first computer programmable motor;
- a first linearly movable element that is movable along a first axis;
- a second linear actuator disposed on one end of said first movable element and including a second computer programmable motor;
- a second linear movable element in the shape of an inverted J is movable by said second actuator along a second axis that is perpendicular to said first axis; and
- a second fixed base is disposed in an open area defined by a U-shaped portion of said inverted J-shaped element and said U-shaped portion including a relatively short elongated opening in the outer short end of said J-shaped element;
- a linearly rotatable actuator disposed on said second fixed base and a slidable/rotatable arm disposed in said linearly/rotatable actuator and having an upwardly extending L-shaped end and a downwardly extending projection generally parallel to said upwardly extending end and into said elongated opening; and
- wherein rotational movement of said arm is controlled by said computer programmable first and second motors for solar tracking.

The invention will now be described in connection with the accompanying drawings wherein like parts have been identified with like numbers.

DESCRIPTION OF THE DRAWINGS

FIGS. 2a, 2b and 2c are schematic illustrations of the modular two axis solar tracking system of FIG. 1 but illustrating the rotational motion of a sliding rotating arm;

FIG. 3 is a schematic illustration of the modular solar tracking system of FIGS. 1 and 2 with a J-shaped member in an opposite position;

FIGS. 4a, 4b, 4c, 4d, 4e and 4f are schematic illustrations of the modular two axis solar tracking system of FIGS. 1 and 2 but illustrating the full rotation of the sliding/rotating arm;

DESCRIPTION OF THE PREFERRED
EMBODIMENTS OF THE INVENTION

Figure 1:
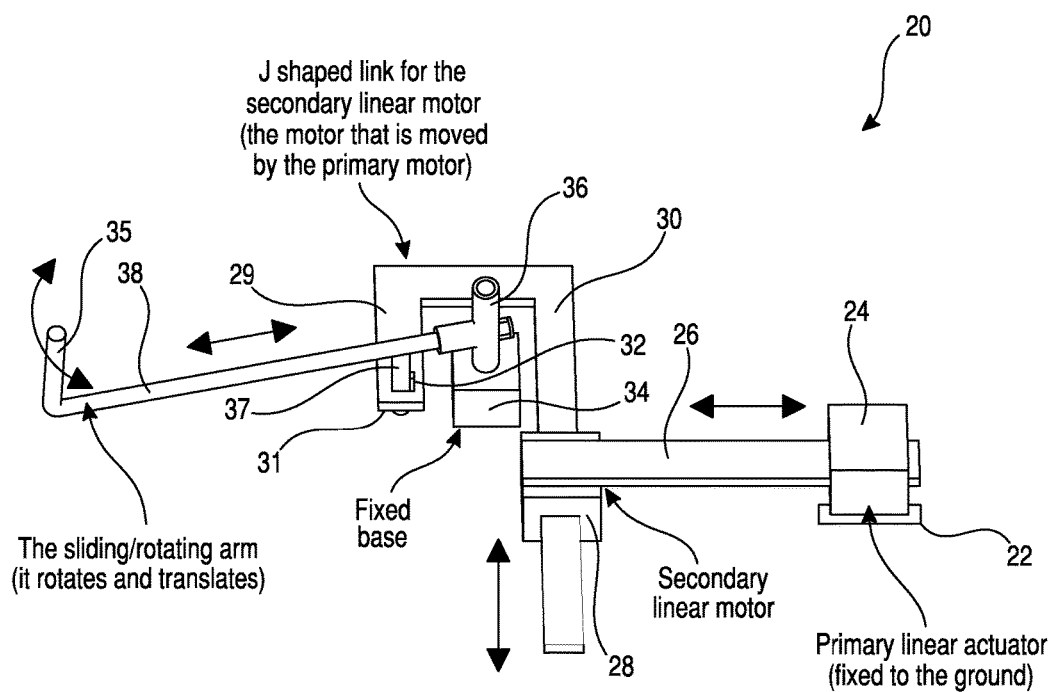
FIG. 1 is a schematic illustration of a modular two axis solar tracking system in accordance with the present invention.

Referring now to FIG. 1, a modular two axis scalar tracking system 20 includes a first fixed base 22 and a first primary linear actuator 24 disposed on said first fixed base 22. The linear actuator 24 includes a first computer programmable motor and a mechanism such as a gear box or gear train for linear movement of a primary movable element 26 along a first axis.

A second linear actuator 28 includes a second computer programmable motor that is fixed at one end of the movable element 26. A second movable element 30 in the form or shape of an inverted J-shape is movable by the second linear actuator 28 along a second axis that is perpendicular to the first axis. The inverted J-shaped element 30 includes a relatively long vertical portion 27 and a relatively short vertical portion 29 that includes a slightly elongated opening 32 near its open end 31.

A second fixed base 34 is disposed in an open area between the relatively long vertical portion 27 and relatively short vertical portion 29 and partially defined by a transverse link 33. The second fixed base 34 includes a rotatable element 36 and an outwardly extending arm 38 that is rotatable about the second fixed base 34 by movements of the primary movable element 26 and the second inverted J-shaped element 30.

As illustrated the outwardly extending arm 38 includes an outer L-shaped end 35 and a downwardly extending projection 37 that extends downwardly at about 90° angle from the arm 38. The downwardly extending projection 37 passes through the elongated opening 32. By contrast the L-shaped end 35 relates to a receiver/collector that is movable in two axis.

Referring now to FIGS. 2 and 3, the sliding/rotating arm 38 is rotated by the primary linear actuator 24 and second linear actuator 28 by moving the second movable element 30 in an upward direction and subsequently or at about the same time moving the primary movable element 26 to the right by the primary linear actuator 24. As shown in FIGS. 2a and 2b this rotates the sliding rotating arm in a clockwise manner.

FIG. 4 illustrates the applicator of the system with the J-shaped movable element 30 arranged to rotate the arm 38 in a clockwise direction.

Figure 5A:
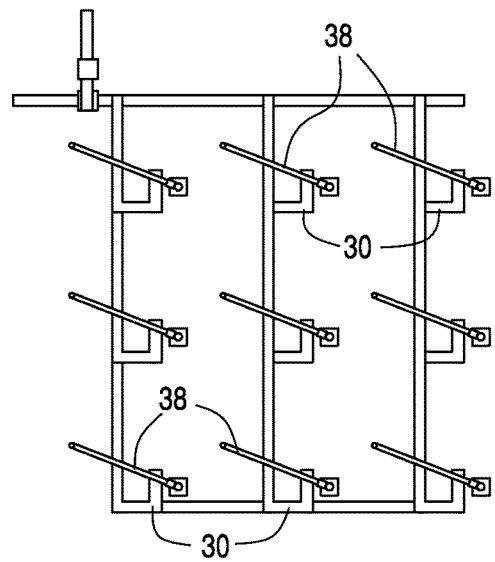
FIGS. 5a, 5b and 5c are schematic illustrations of a mechanism to move a plurality of solar collectors in two axis using only two motors.
Figure 5B:
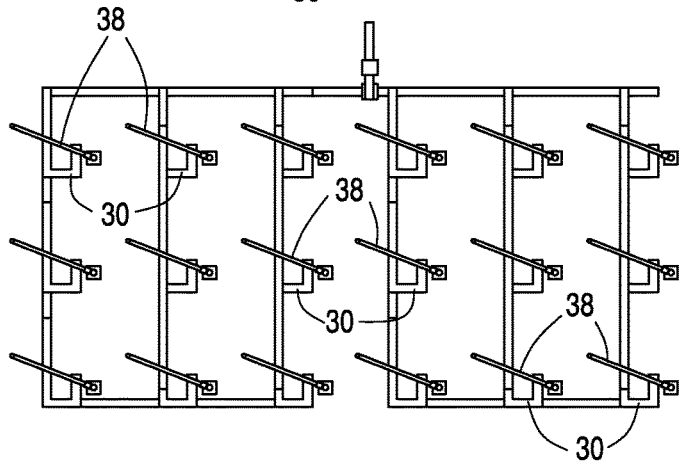
Figure 5C:
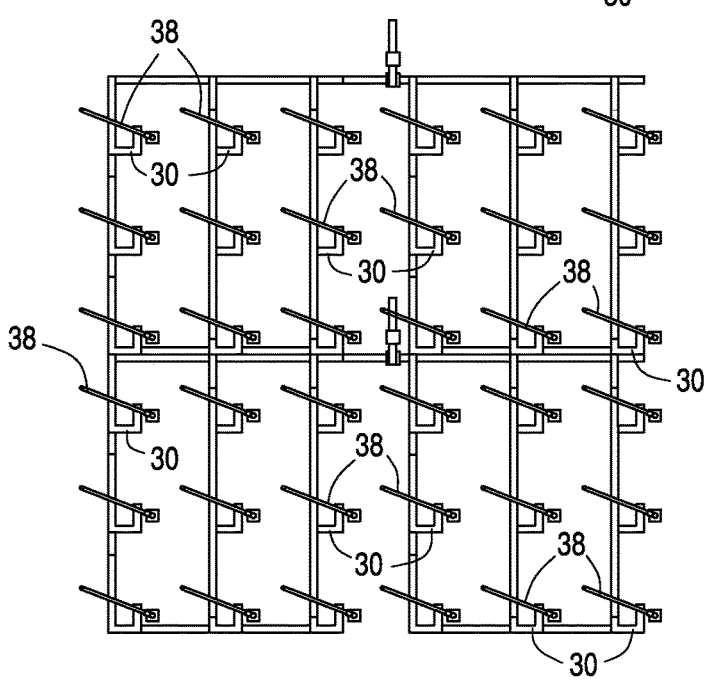
Figure 6:
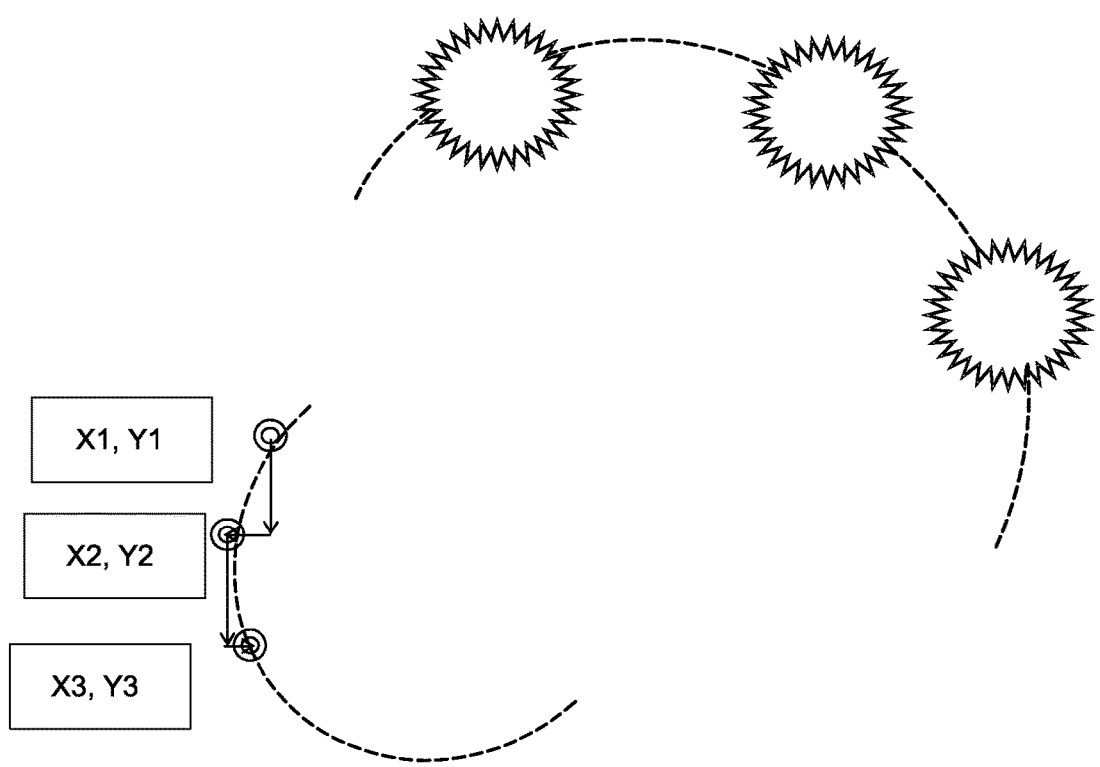
FIG. 6 is a schematic illustration of the system applied to a parabolic dish tracking the sun from sunrise to sunset, where the angular motions (azimuth and elevation) are tracked by two linear displacements.

As illustrated in FIGS. 5a, 5b and 5c a plurality of 9, 18 and 36 slidable/rotatable arms 38 for moving collectors to track the sun to thereby maximize the output of each collector.

While the invention has been described in connection with its accompanying drawings, it should be recognized that changes and modifications may be made therein without departing from the scope of the appended claims.

What is claimed is:

1. A two axis solar tracking system comprises:
a first fixed base and a primary linear actuator disposed on said first fixed base and having a first computer programmable motor;
a first linearly movable element that is movable along a first axis;
a second linear actuator disposed on one end of said first movable element and including a second computer programmable motor;
a second linear movable element in the shape of an inverted J is movable by said second actuator along a second axis that is perpendicular to said first axis; and
a second fixed base disposed in an open area defined by a U-shaped portion of said inverted J-shaped element and said U-shaped portion including a relatively short elongated opening in the outer short end of said J-shaped element;
a linearly rotatable actuator disposed on said second fixed base and a slidable/rotatable arm disposed in said linearly/rotatable actuator and having an upwardly extending L-shaped end and a downwardly extending projection generally parallel to said upwardly extending end and into said elongated opening; and
wherein rotational movement of said arm is controlled by said computer programmable first and second motors for solar tracking, and
wherein said slidable/rotatable arm is rotated by the primary and second linear actuators by moving the first and second linear movable elements.

2. The two axis solar tracking system according to claim 1, which includes a solar collector at the end of said slidable/rotatable arm.

3. The two axis solar tracking system according to claim 2, in which said solar collection includes a lens between an outer portion of said collector and the sun for concentrating the sun's rays on said collector.

4. The two axis solar tracking system according to claim 3, which includes a plurality of slidable/rotatable arms and a solar collector attached and movable to receive the direct rays of the sun at the end of each of said slidable/rotatable arms.

5. The two axis solar tracking system according to claim 4, which includes between 9 and 36 slidable/rotatable arms.

6. A two axis solar tracking system consisting of:
a first fixed base and a primary linear actuator disposed on said first fixed base and having a first computer programmable motor;
a first linearly movable element that is movable along a first axis;
a second linear actuator disposed on one end of said first movable element and including a second computer programmable motor;
a second inverted J-shaped linear movable element movable by said second actuator along a second axis that is perpendicular to said first axis; and
a second fixed base disposed in an open area defined by a U-shaped portion of said inverted J-shaped element and said U-shaped portion including a relatively short elongated opening in the outer short end of said J-shaped element;
a linearly rotatable actuator disposed on said second fixed base and a slidable/rotatable arm disposed in said linearly/rotatable actuator and having an upwardly extending L-shaped end and a downwardly extending projection generally parallel to said upwardly extending end and into said elongated opening; and wherein rotational movement of said arm is controlled by said computer programmable first and second motors for solar tracking, and wherein said slidable/rotatable arm is rotated by the primary and second linear actuators by moving the first and second linear movable elements.

7. The two axis solar tracking system according to claim 6, in which said system further consists of a plurality of slidable/rotatable arms and a solar collector adjustable to receive the direct rays at the end of each of said arms and a lens disposed in front of each of said collectors for concentrating the rays of the sun on said collector.

* * * * *